United States Patent [19]

Takayanagi

[11] Patent Number: 5,680,226
[45] Date of Patent: Oct. 21, 1997

[54] IMAGE RECORDING APPARATUS

[75] Inventor: Hiroshi Takayanagi, Kanagawa, Japan

[73] Assignee: Fuji Xerox Co., Ltd., Tokyo, Japan

[21] Appl. No.: 595,874

[22] Filed: Oct. 10, 1990

[51] Int. Cl.$^6$ .............................. H04N 1/40; G06F 15/00; G06K 9/34
[52] U.S. Cl. .................... 358/462; 382/176; 382/173; 395/109
[58] Field of Search ...................... 358/400, 401, 358/429, 443, 447, 448, 453, 455, 458, 462, 467, 468, 474, 296, 298; 382/54, 173, 176, 190; 347/171, 188, 183; 395/109

[56] References Cited

U.S. PATENT DOCUMENTS

| | | | |
|---|---|---|---|
| 4,251,837 | 2/1981 | Janeway, III | 358/455 |
| 4,851,861 | 7/1989 | Kikuchi et al. | 346/76 PH |
| 4,926,268 | 5/1990 | Kawamura et al. | 358/456 |
| 4,947,345 | 8/1990 | Paradise et al. | 358/442 |
| 4,959,687 | 9/1990 | Katoh et al. | 355/214 |
| 4,992,955 | 2/1991 | Yabuchi et al. | 358/456 |

Primary Examiner—Edward L. Coles, Sr.
Assistant Examiner—Jerome Grant, II
Attorney, Agent, or Firm—Finnegan, Henderson, Farabow, Garrett & Dunner, L.L.P.

[57] ABSTRACT

An image recording apparatus having a multi-level image input component for reading graphic information and for transmitting the graphic information as multi-level image data, a two-level image input component for reading graphic information and for transmitting the graphic information as two-level image data, an image printing component for printing image data received therein as a multi-level image or a two-level image based on predetermined print parameters, an image data recognizing component for determining whether the image data received from either of the multi-level image input component and the two-level image input component, is multi-level image data or two-level image data, and a print parameter changing component for changing the print parameters in the image printing component based on the determination made by the image data recognizing component.

11 Claims, 11 Drawing Sheets

FIG. 7

| RESOLVING POWER | TONE NO. | CHROMATIC STRUCTURE | PRESENCE OR ABSENCE OF PHOTOGRAPHIC MODE DESIGNATION |
|---|---|---|---|

| COPY NO. | DUPLEX COPY | STAPLING | SPECIAL TREATMENT |
|---|---|---|---|

| FS BYTE NO. | SS BYTE NO. | PAGE NO. |
|---|---|---|

| FILE NAME |
|---|
| FILE NUMBER |
| IMAGE DATA STRUCTURE |
| PROCEDURE OF TREATMENT |
| DATA QUANTITY |
| IMAGE DATA |
| --- |
| END OF DATA |
| ETC. |

1

IMAGE RECORDING APPARATUS

BACKGROUND OF THE INVENTION

1. Field of the Invention

The present invention relates to an image recording apparatus, and, particularly, relates to a multifunctional image recording apparatus in which multi-level images and two-level images are read by a plurality of image input means and are printed.

2. Discussion of the Related Art

A multifunctional image recording apparatus has been known which includes a scanner for reading documents, an I/O mother card for receiving images from a facsimile machine (hereinafter abbreviated "FAX"), a personal computer (hereinafter abbreviated "PC"), a work station (hereinafter abbreviated "WS"), and the like, and a printer for performing printing based on the image data from the scanner or the I/O mother card.

In the multifunctional image recording apparatus, the frequency of use of the copying function is high, in general. Accordingly, image data read by the scanner is, in most cases, multi-level image data. Therefore, print parameters in the printer are set to maintain the reproducibility of the multi-level images.

On the contrary, data from a FAX, PC and WS are, in most cases, two-level image data. In the conventional apparatus, the print parameters suitable to the reproduction of multi-level images are applied to the two-level image data. This causes a problem in that the picture quality in the two-level image data is deteriorated.

On the other hand, in the conventional apparatus, optimization of the picture quality of the two-level image and the multi-level image has not been given any consideration even though images generated from PC and WS may include multi-level images.

SUMMARY OF THE INVENTION

The present invention has been made in view of the above circumstances and has as an object an image recording apparatus in which input images are automatically separated into a multi-level image group and a two-level image group on the basis of the fact that two-level images are in most cases so-called orthographic images generated as font images substantially without halftone images, to individually optimize a printing processing to maintain the picture quality of the respective image group.

Additional objects and advantages of the invention will be set forth in part in the description which follows and in part will be obvious from the description, or may be learned by practice of the invention. The objects and advantages of the invention may be realized an attained by means of the instrumentalities and combinations particularly pointed out in the appended claims.

To achieve the object and in accordance with the purpose of the invention, as embodied and broadly described herein, according to an aspect of the present invention, the image recording apparatus comprises multi-level image input means for reading graphic information and for transmitting the graphic information as multi-level image data, two-level image input means for reading graphic information and for transmitting the graphic information as two-level image data, image printing means for printing image data received therein as a multi-level image or a two-level image based on predetermined print parameters, image data recognizing means for determining whether the image data received from either of the multi-level image input means and the two-level image input means is multi-level image data or two-level image data, and print parameter changing means for changing the print parameters in the image printing means based on the determination made by the image data recognizing means.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIG. 7 is an explanatory view showing an example of the image data file;

DETAILED DESCRIPTION OF THE PREFERRED EMBODIMENTS

Figure 1:
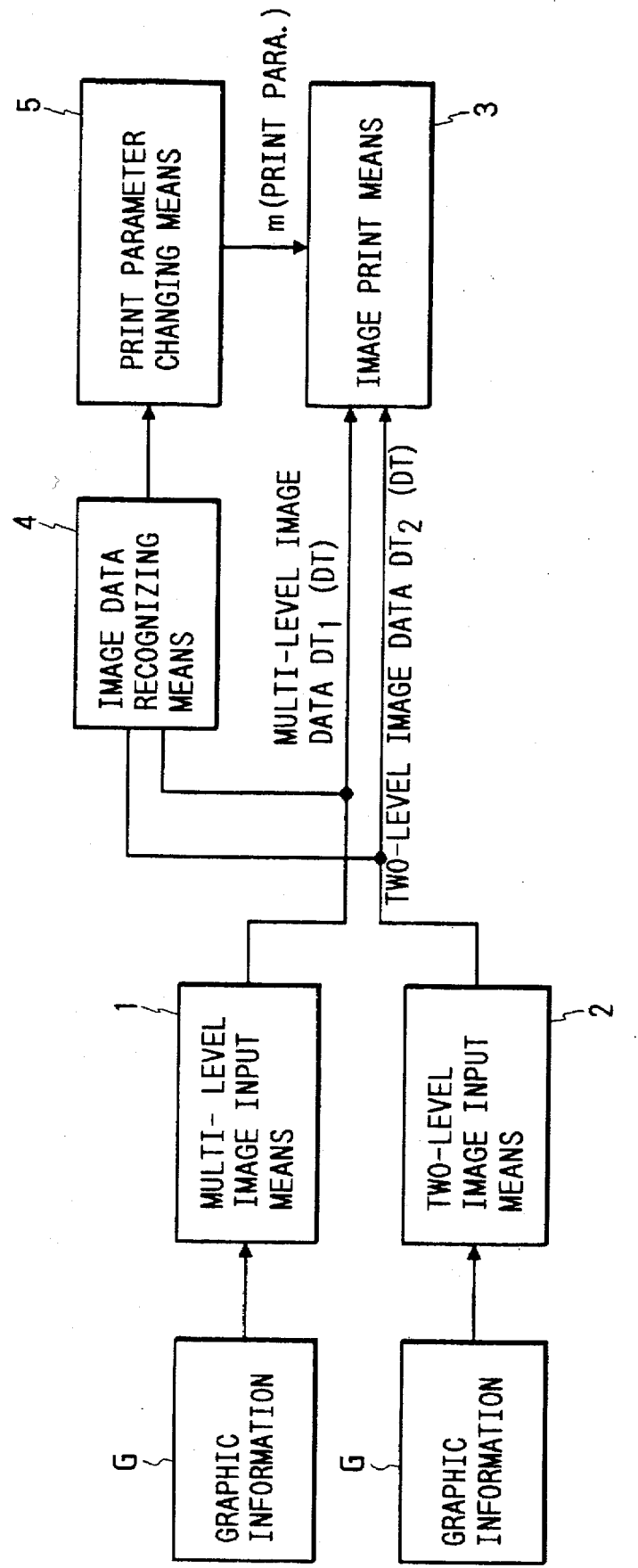
FIG. 1 is an explanatory view showing the outline of the digital electrophotographic copying apparatus according to the present invention.

First, referring to FIG. 1, the outline of the digital electrophotographic copying apparatus according to the present invention will be described. In the digital electrophotographic copying apparatus, according to an aspect of the present invention, the image recording apparatus comprises a multi-level image input means 1 for reading in graphic information G and for outputting the graphic information as multi-level image data DT (specifically $DT_1$); a two-level image input means 2 for receiving graphic information G and for outputting the graphic information G as two-level image data DT (specifically $DT_2$); an image printing means 3 for printing the image data DT received therein as a multi-level image or a two-level image based on predetermined print parameters m; an image data recognizing means 4 for determining whether the image data DT received therein is multi-level image data DT (specifically $DT_1$) or two-level image data DT (specifically $DT_2$); and a print parameter changing means 5 for changing the print parameters m in the image printing means 3 based on the result of the determination made by the image data recognizing means 4.

In the aforementioned apparatus, the multi-level image input means 1 is perfectly separated from the two-level image input means 2. However, it is a matter of course that one image input means may serve as the multi-level image input means 1 and also as the two-level image input means 2. In general, the apparatus includes a scanner for reading documents. However, the present invention can also be applied to an apparatus having no scanner.

The image printing means 3 may include any suitable means such as an electrophotographic process type, a thermal transfer type, a ink-jet type and the like, so long as the means has a printing portion having the ability to reproduce multi-level images. The print format in the image printing means includes color printing as well as monochrome printing.

As the image data recognizing means 4, any suitable means can be used so long as it can judge whether the input image data is multi-level image data or two-level image data. For example, when the multi-level image input means 1 and the two-level image input means 2 (for example, a scanner and an FAX) are perfectly separated from each other, the input image data DT may simply be recognized based on whether the input image data DT is obtained from the multi-level image input means 1 or obtained from the two-level image input means 2. When a specific image input means serves as the multi-level image input-means 1 and also as the two-level image input means 2 (for example, PC, WS), the input image data DT may be recognized based on the quantity of data per pixel in the input image data DT.

In the print parameter changing means 5, any suitable factor giving a change to a characteristic of the printing portion of the image printing means 3 can be selected as a print parameter m. For example, when the image printing means 3 performs a printing operation according to an electrophotographic process, changing at least a development bias voltage as a print parameter m is preferred because such a change can directly effect the characteristic of the printing portion.

In the print parameter changing means 5, it is necessary to change the print parameter m between a level suitable to the multi-level image and a level suitable to the two-level image. It is a matter of course that the print parameter m may be changed more finely according to the number of tones or the like.

In the print parameter changing means 5, the print parameter m can be set to any suitable level. From the viewpoint of reducing the cost of the image printing means, it is preferable that a print parameter m corresponding to the picture quality setting mode is used when the image printing means 3 has a picture quality setting portion having the ability to select a mode for image printing.

In this case, it is preferable from the viewpoint of reproduction of two-level images that a mode "Slightly Thin" or "Thin" is selected from the picture quality setting modes in the picture quality setting portion when the image data recognizing means 4 determines that the input image data DT is two-level image data $DT_2$.

The image data recognizing means 4 judges whether the input image data DT is multi-level image data $DT_1$ or two-level image data $DT_2$. The print parameter changing means 5 changes the print parameter m based on the judgment of the image data recognizing means 4.

Accordingly, the image printing means 3 carries out a printing operation on the basis of the print parameter m which is optimized corresponding to the type (multi-level image or two-level image) of the input image data.

The present invention will be described in detail as to the preferred embodiments thereof illustrated in the accompanying drawings.

Figure 2:
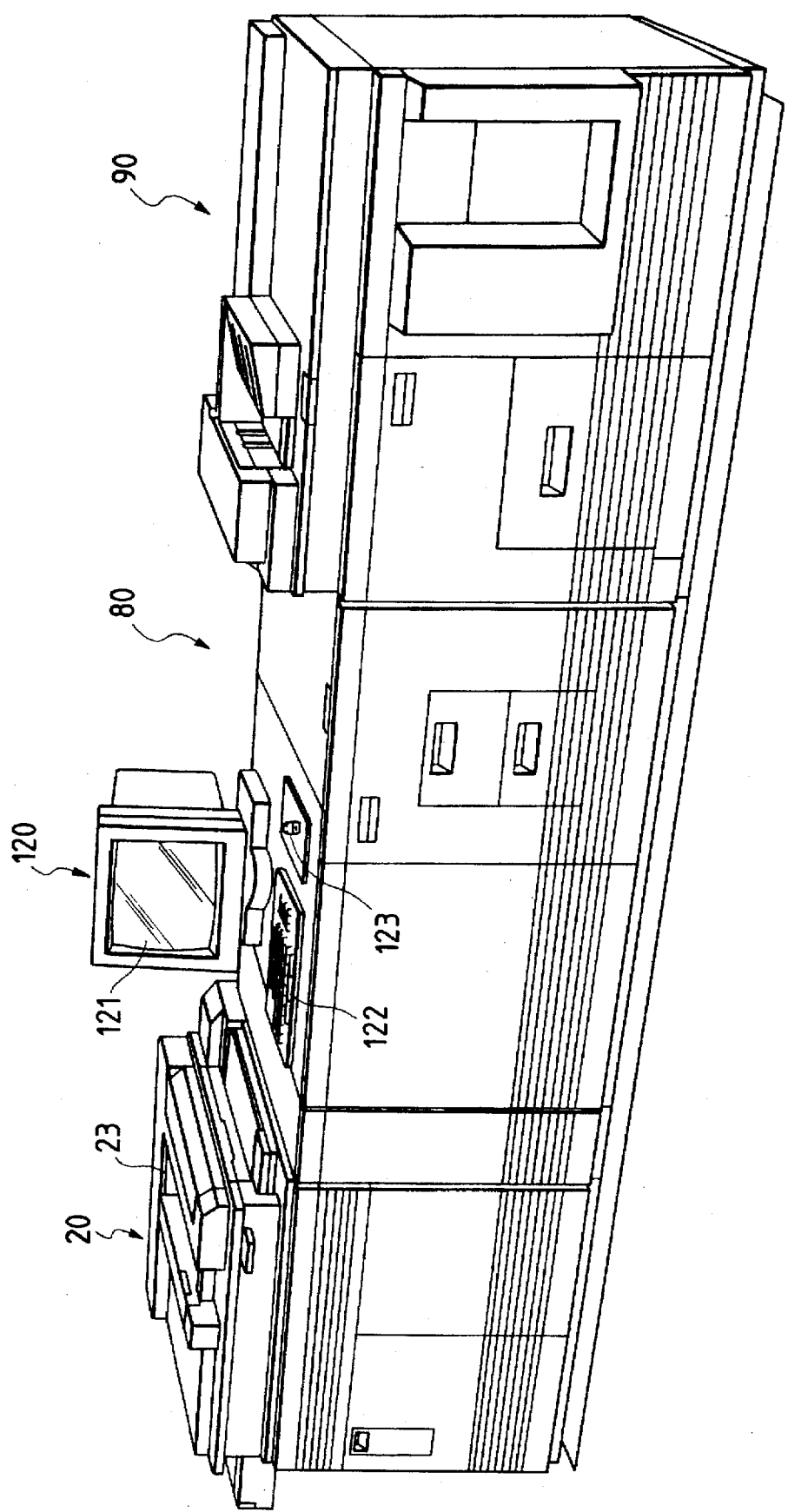
FIG. 2 is a perspective view showing the external appearance of the digital electrophotographic copying apparatus as related to an embodiment thereof.

FIG. 2 is a perspective view showing the outline of a digital electrophotographic copying apparatus according to the present invention. The apparatus has a first image input device 20 for reading a document as digital image data DT (which is, in this embodiment, 8-bit multi-tone image data), a second image input device 60 for receiving two-level image data, an image storage device 80 for storing the image data DT obtained from the first image input device 20 or the second image input device 60, an image printer 90 for carrying out an electrophotographic process based on the image data DT stored in the image storage device 80, a user interface 120 for designating the contents of a reproduction job and for checking the contents of printing, and a controller (not shown) for correlatively controlling the first image input device 20, the second image input device 60, the image storage device 80 and the image printer 90 in accordance with the instructions supplied through the user interface 120.

In this embodiment, all images are once stored in the image storage device 80. Accordingly, a plurality of copies can be obtained from one document by a single scanning operation in the image input device 20. Also, a plurality of copies of several documents can be obtained by a single scanning operation in the image input device, because all the documents are read and sequentially stored as image data in the image storage device 80 and then the image data is sequentially read from the image storage device and printed.

Figure 3:
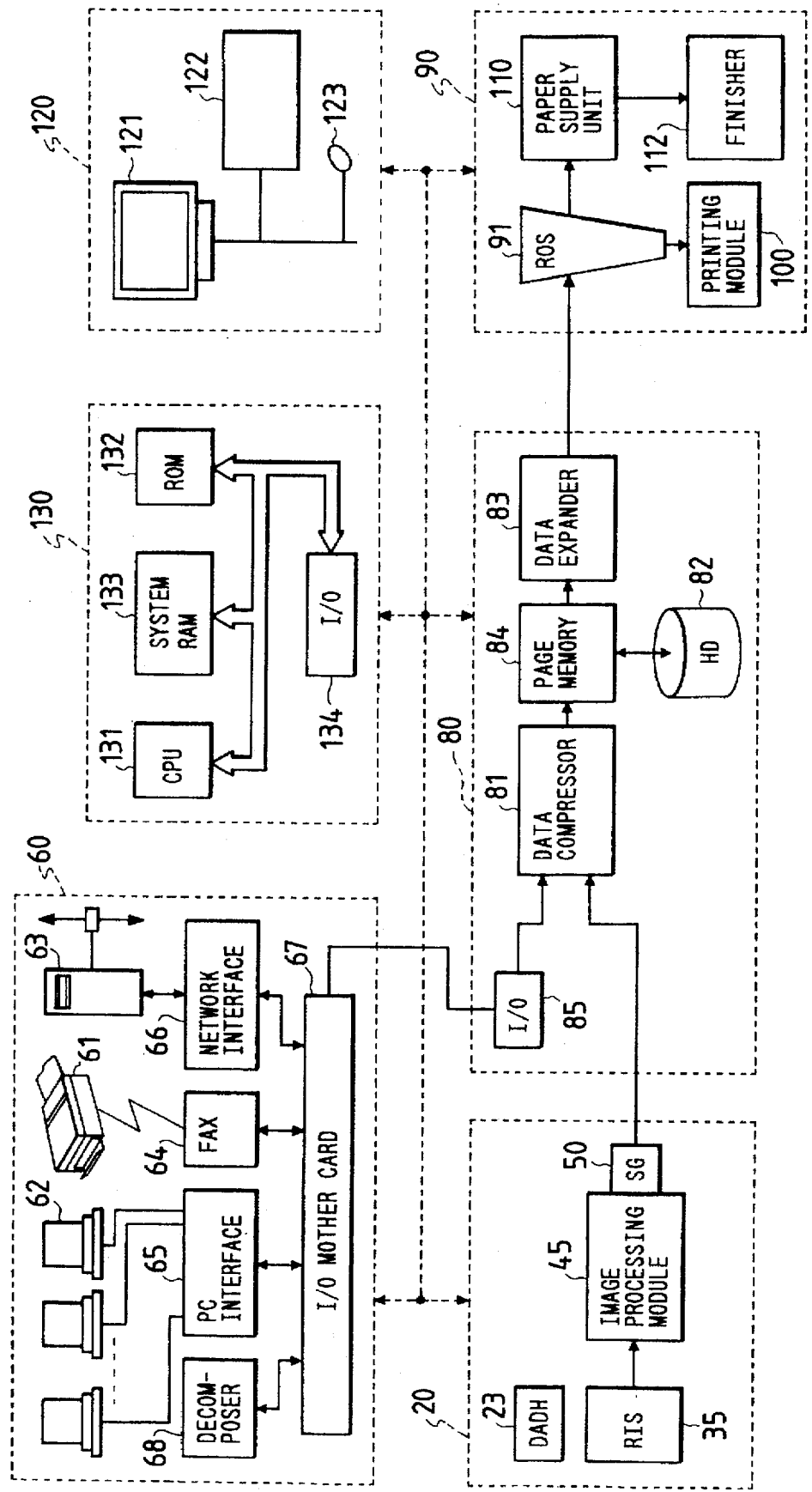
FIG. 3 is a block diagram of the digital electrophotographic copying apparatus as related to an embodiment thereof.
Figure 4:
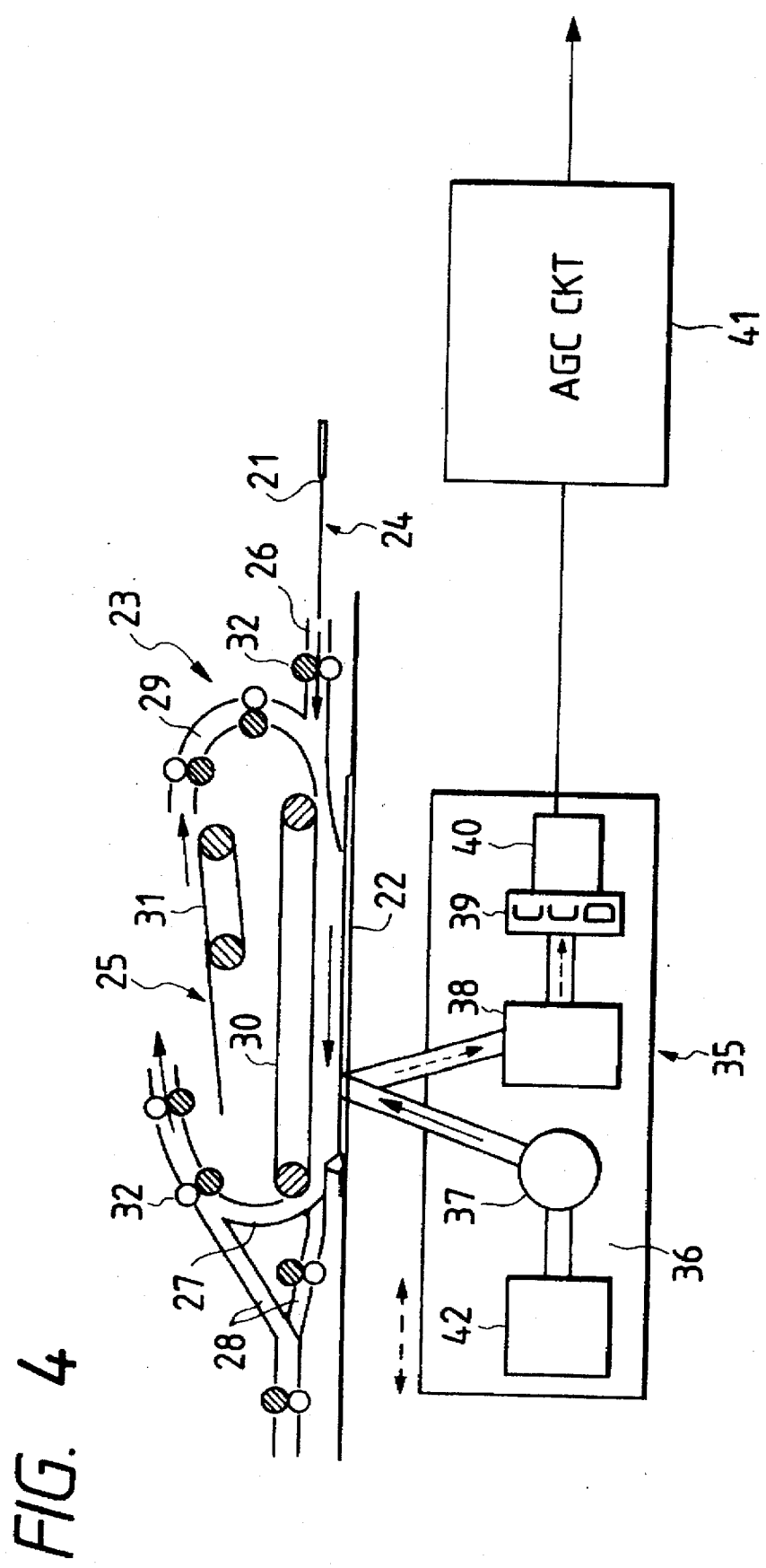
FIG. 4 is an explanatory view showing the details of the DADH and the RIS.
Figure 5:
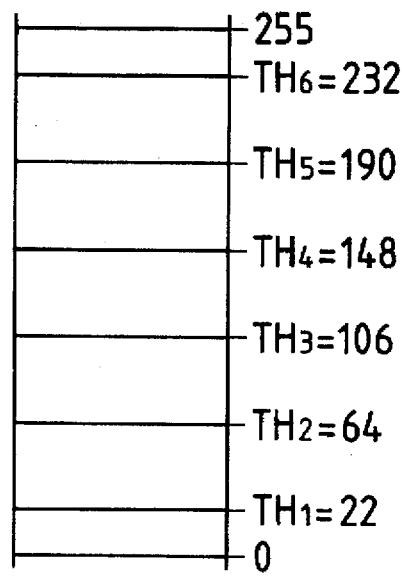
FIG. 5 is an explanatory view showing the theory of setting of thresholds in thresholding.

As shown in FIGS. 3 and 4, this device has a duplex automatic document handler 23 (hereinafter abbreviated "DADH") for automatically feeding documents 21 sequentially onto a platen 22, a 400 dpi raster input scanner 35 (hereinafter abbreviated "RIS") for reading the documents 21 on the platen 22, an image processing module 45 for carrying out various kinds of processing (such as shading correction, ghost correction, ground reveal removal, etc.) and various kinds of editing processing (scale-up and scale-down, italic type, half-tone dot meshing type, whitepainted type, shadow type, etc.) upon image data DT from the RIS 35, and a screen generator (hereinafter abbreviated "SG") 50 for reducing to 3 bits the number of tones in the image data DT processed by the image processing module 45 and for sending out the image data DT as pseudo tone image data DT.

In this embodiment, the DADH 23 comprises a document supply path 26 for feeding a document 21 from a document set position 24 toward the platen 22, a document feedback path 27 for feeding back the document 21 from the platen 22 toward a document reception position 25, a document inversion feedback path 28 for feeding back the document 21 from the platen 22 to the document reception position 25 after inverting the document 21, a document re-supply path 29 for feeding the document 21 from the document reception position 25 toward the platen 22 again, a document transport 30 for transporting the document 21 from the document supply path 26 and the document re-supply path 29 onto the platen 22, and feed rolls 31 and feed belts 32 suitably arranged in the respective document feed paths 26 to 29.

When a single-sided document 21 is supplied, the document feed paths 26 and 27 are used. When a double-sided document is supplied, the document feed paths 26 and 28 are used first and then the document feed paths 29 and 27 are used.

The RIS 35 has a scanning fluorescent lamp 37 mounted onto a scanning carriage 36 moving along one side of the platen 22, so that light from the moving fluorescent lamp 37 is directed onto the document 21 on the platen 22 and then the light reflected from the document is led to an image sensor 39 (which, in this embodiment, is constituted by a charge coupled device [CCD]) through an optical system 38 suitably arranged. The image data read by the image sensor 39 is sent to an automatic gain control circuit 41 through a sensor interface 40 and then fed to the image processing module 45 after suitable gain control.

In FIG. 4, the reference numeral 42 designates a lamp heater for performing temperature control for the fluorescent lamp 37.

The SG 50 used in this embodiment converts image data DT having 256 tones into pseudo tone image data DT' having 7 tones (including a zero-level tone). The SG 50 comprises an error diffusion circuit and a thresholding circuit (which are not shown).

When input image data DT is separated by predetermined thresholds according to a screen pattern (equivalent to a threshold pattern) given from a screen pattern setting circuit, the error diffusion circuit successively diffuses the influence of differential data (error data) between the image data DT and the threshold. The thresholding circuit compares data from the error diffusion circuit with the screen pattern to perform 7-tone thresholding upon the image data DT.

The screen pattern setting circuit sets thresholds. In this embodiment, as shown in FIG. 6, the circuit sets six thresholds ($TH_1$ to $TH_6$) for separating 255 tones into 7 tones.

Figure 6:
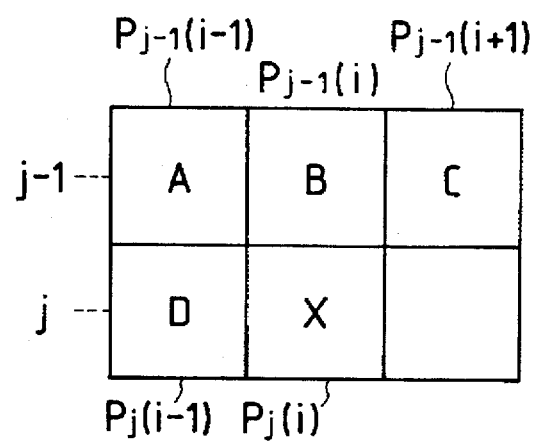
FIG. 6 is an explanatory view showing the algorithm in the error diffusion circuit.

The basic algorithm in the error diffusion circuit is shown in FIG. 6. In FIG. 6, a corrected image data X' in a target pixel $P_{j(i)}$ arranged in the j-th line and the i-th column is calculated based on the following equations:

$$\Delta X = k_1 A + k_2 B + k_3 C + k_4 D$$

where $\Sigma k_j = 1$ for i=1 to 4 \quad (1)

$$X' = X + \Delta X \quad (2)$$

in which X represents the data of the target pixel $P_{j(i)}$, A, B and C represent differential data between the target pixel $P_{j(i)}$ and pixels $P_{j-1(i-1)}$, $P_{j-1(i)}$ and $P_{j-1(i+1)}$ respectively arranged in the (j-1)-th line and the (i-1)-th, i-th and (i+1)-th columns, D represents a differential data between the target pixel $P_{j(i)}$ and a just prior pixel $P_{j(i-1)}$, $\Delta X$ represents a differential correction data, and $k_1$ to $k_4$ represent correction coefficients for weighting the differential data between the target pixel and the respective pixels correspondingly to the degree of the influence thereof.

In FIG. 3, image data DT from a FAX 61, a PC 62, and a WS 63 are taken in an I/O mother card 67 through an FAX interface 64, a PC interface 65, and a network interface 66, respectively.

The reference numeral 68 designates a decomposer for decomposing FAX 61 images and code data obtained from the PC or WS to convert the data into bit-map data. High-quality halftone images from the WS 63 are converted into bit-map data corresponding to the number of reproduction tones (in this embodiment, 3 bits) in the image printer 90.

In FIG. 3, the image storage device 80 comprises a data compressor 81 for compressing pseudo tone image data DT from the SG 50 or image data DT from the I/O mother card 67 according to known compression algorithms, a hard disk device 82 for storing the image data DT' compressed by the data compressor 81 as an image data file (refer to FIG. 8), a data expander 83 for expanding the compressed image data DT' stored in the hard disk device 82 according to known expansion algorithms, a page memory 84 serving as a buffer for temporarily storing image data DT' of one page when the image data DT' from the data compressor 81 is stored in the hard disk device 82 or when the image data DT' from the hard disk device 82 is transferred to the data expander 83, and an I/O interface 85 for receiving the image data DT sent from the I/O mother card 67.

In this embodiment, the attribute information of the image data file, as well as the image data file, is stored as coded information in the hard disk device 82. Alternatively, the attribute information may be stored in a memory provided independent of the hard disk device 82 after the image data file and the attribute information are related to each other to make a pair.

As shown in FIG. 7, the attribute information of the image data contains the image data structure [the resolving power in each page, the number of tones, the chromatic structure (color or monochrome), the presence or absence of photographic mode designation, etc.], the procedure of treatment [the number of copies, duplex (double-side) copy, stapling, and special treatment], the quantity of data [the number of effective bits or bytes (equivalent to page size) in the fast scanning direction (main scanning direction) and slow scanning direction (auxiliary scanning-direction), and the number of pages], and the like [image data, etc.].

In this embodiment, the image data file stored in the hard disk device 82 is printed out by the image printer 90 based on the attribute information which may be designated by the user interface 120, such as the electronic RDH, scale-up or scale-down to designated magnification, the number of copies, double-sided/ single-sided, stapling, tape binding, and the like. When the image data file has been printed out, the image data file as well as the attribute information is erased from the hard disk device 82.

In FIG. 3, the image printer 90 comprises a raster output scanner (hereinafter abbreviated "ROS") 91 for generating an optical image based on the image data DT from the data expander 83, a printing module 100 for forming a latent image corresponding to the optical image generated by the ROS 91 and for making the latent image visible on recording paper, a paper supply unit 110 for supplying recording paper to the printing module 100 in synchronism with the writing timing of the ROS 91, and a finisher 112 for carrying out suitable post-processing (such as stapling, tape binding, etc.) upon a bundle of printing paper when the printing operation of the printing module 100 is finished.

Figure 8:
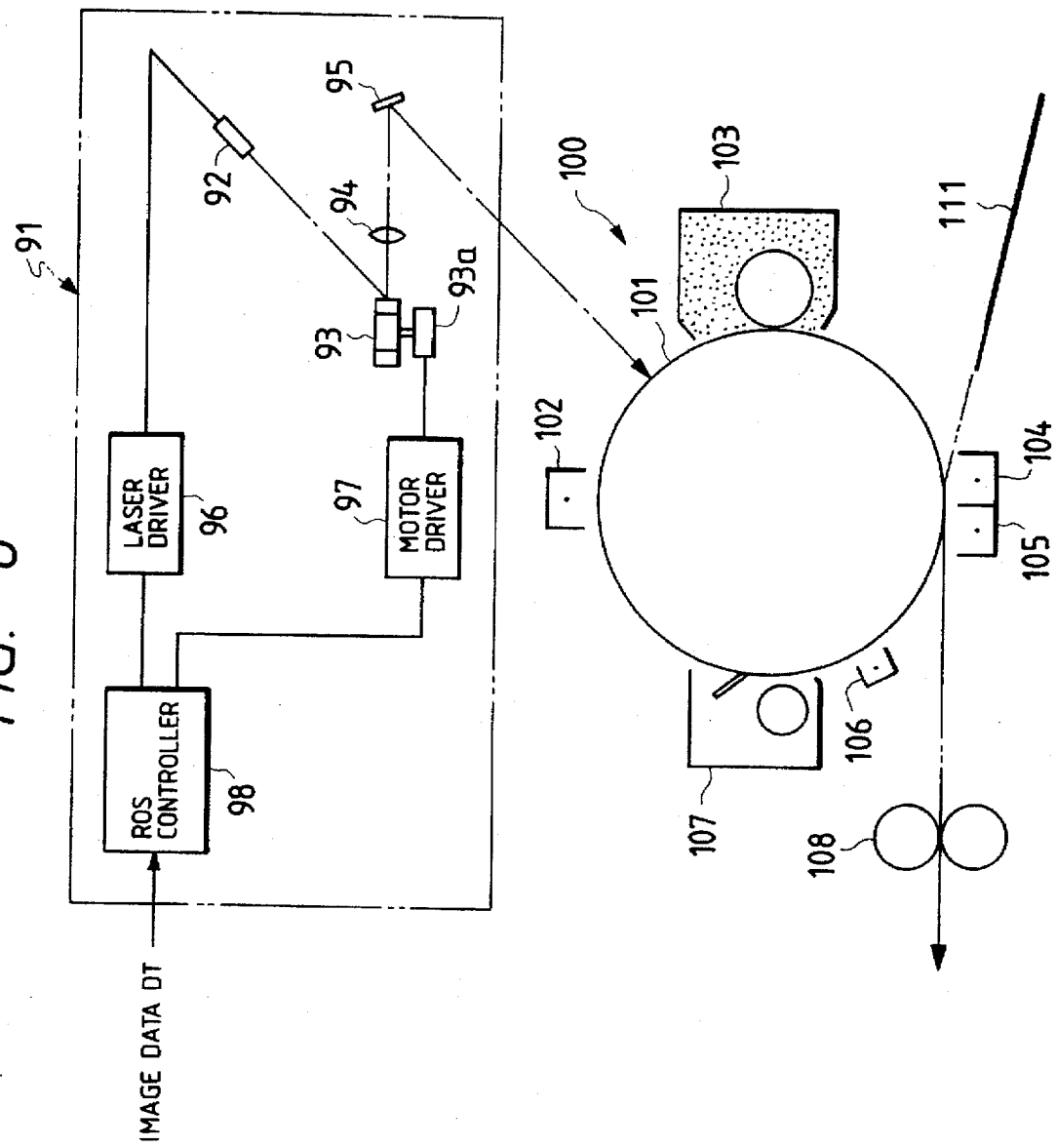
FIG. 8 is an explanatory view showing the details of the ROS and the printing module.

In this embodiment, the ROS 91 and the printing module 100 are constituted as shown in FIG. 8. ROS 91 includes a semiconductor laser 92, a polygon mirror 93 for deflecting beams from the semiconductor laser 92 in a predetermined scanning range, an imaging lens 94 for converging the beams deflected by the polygon mirror 93 to form an image along a scanning line on a photosensitive drum 101 which will be described later, a reflection mirror 95 for directing the beams to the scanning line position on the photosensitive drum 101, a laser driver 96 for driving the semiconductor laser 92, a motor driver 97 for driving a drive motor 93a of the polygon mirror 93, and an ROS controller 98 for providing a predetermined control signal to the laser driver 96 and the motor driver 97 based on the image data DT' from the image storage device 80.

Figure 9:
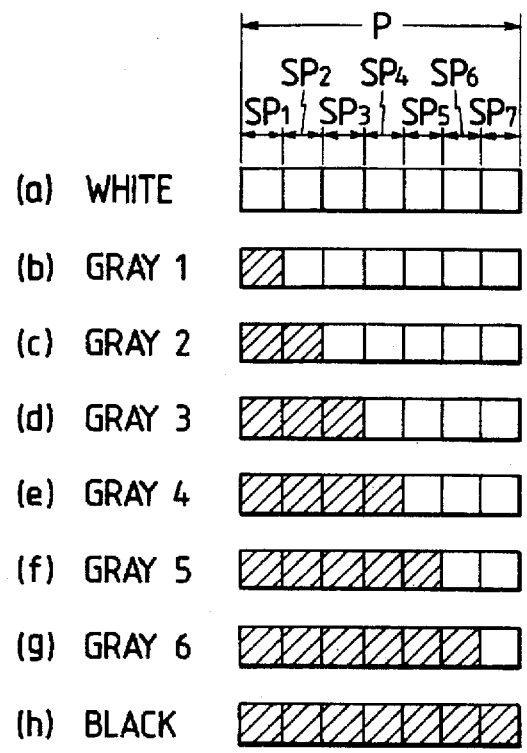
FIG. 9 is an explanatory view showing the operation of the ROS controller.

In this embodiment, the ROS controller 98 separates one pixel P into sub-pixels $SP_1$ to $SP_7$ correspondingly to the number of tones (7 tones: 3 bits) of the image data DT' from the image storage device 80 as shown in FIG. 9 and lightens suitable ranges of the sub-pixels $SP_1$ to $SP_7$ to form pulse widths for the respective tones (white, gray 1, gray 2 ..., gray 6, and black) to thereby perform pulse-width modulation for the driving signal to the semiconductor laser 92.

The printing module 100 includes a photosensitive drum 101 having a photoconductive photoreceptor layer formed on its outside, an electrification corotron 102 for preliminarily electrifying the photosensitive drum 101, a developer 103 for performing toner development on the latent image (negative latent image in which the electric potential of the image portion is lower than that of the background portion or positive latent image in which the electric potential of the image portion is higher than that of the background portion) written on the photosensitive drum 101 by the ROS 91, a transfer corotron 104 for electrically charging printing paper 111 supplied from the paper supply unit 110 to thereby transfer the toner image on the photosensitive drum 101 to the printing paper 111, a separation corotron 105 for separating the printing paper 111 from the photosensitive drum 101 when the transfer processing is finished, an electric charge removing corotron 106 for removing electric charges remaining on the photosensitive drum 101, a cleaner 107 for removing toner remaining on the photosensitive drum 101, and a thermal-fixing type fuser 108 for heating and fixing the toner image transferred to the printing paper 111.

Figure 10:
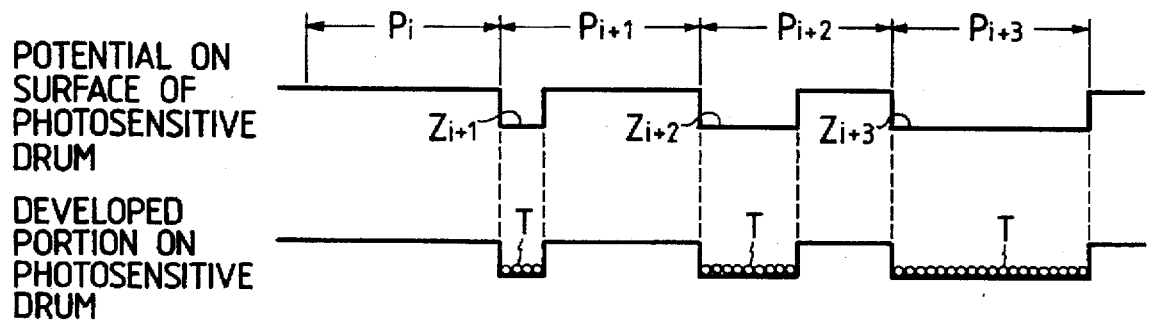
FIG. 10 is an explanatory view showing the image forming processing in the printing module.

In the printing module 100, as shown in FIG. 10, negative latent images $Z_{i+1}$, $Z_{i+2}$ and $Z_{i+3}$ having different pulse widths for respective pixels $P_{i+1}$, $P_{i+2}$ and $P_{i+3}$ are formed on the photosensitive drum 101 by the ROS 91. The negative latent images Z are developed, by the developer 103, into visible toner images T having predetermined pulse widths.

In FIGS. 2 and 3, the user interface 120 has a CRT display 121 for displaying job programs and the like, a control board 122 for indicating the job programs and the like, and a mouse 123 for indicating the designated position on the CRT display 121.

In FIG. 3, the controller 130 comprises a CPU 131 for generally controlling the first image input device 20, the second image input device 60, the image storage device 80, and the image printer 90 according to the instructions from the user interface 120, an ROM 132 for preliminarily storing various types of programs to be executed by the CPU 131, a system RAM 133 for storing rewritable data for the purpose of data exchange with respect to the CPU 131, and an I/O interface 134 for connecting the CPU 131 to an external apparatus.

In this embodiment, starting programs for starting respective devices, job progression programs for executing jobs in respective devices, failure control programs for controlling failures in respective devices, and the like, are preliminarily stored in the ROM 132.

Figure 11:
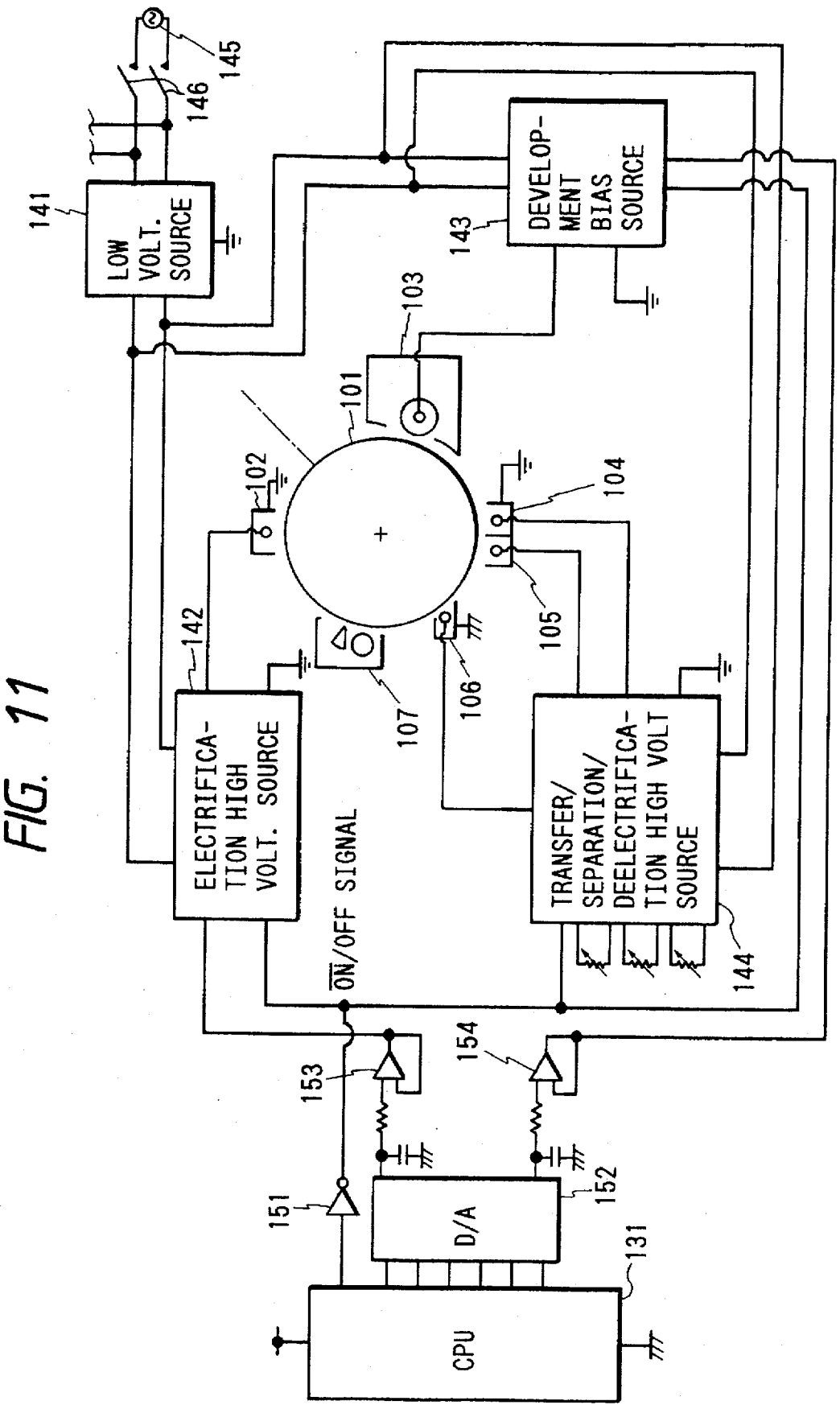
FIG. 11 is a block diagram showing an example of construction of the picture quality control system.

A picture quality control system in this embodiment is shown in FIG. 11, and includes a low-voltage source 141, an electrification high-voltage source 142, a development bias source 143, a transfer/separation/deelectrification high-voltage source 144, a commercialized source 145, and a source switch 146.

In this embodiment, the CPU 131 sends out an ON/OFF signal to the high-voltage sources 142 to 144 through an inverter 151 and selects an electrification control signal (which changes according to the type of the image data DT) as an analog signal through a D/A converter 152 and sends out an electrification control signal to the electrification high-voltage source 142 and the development bias source 143 through circuits 153 and 154.

Figure 12:
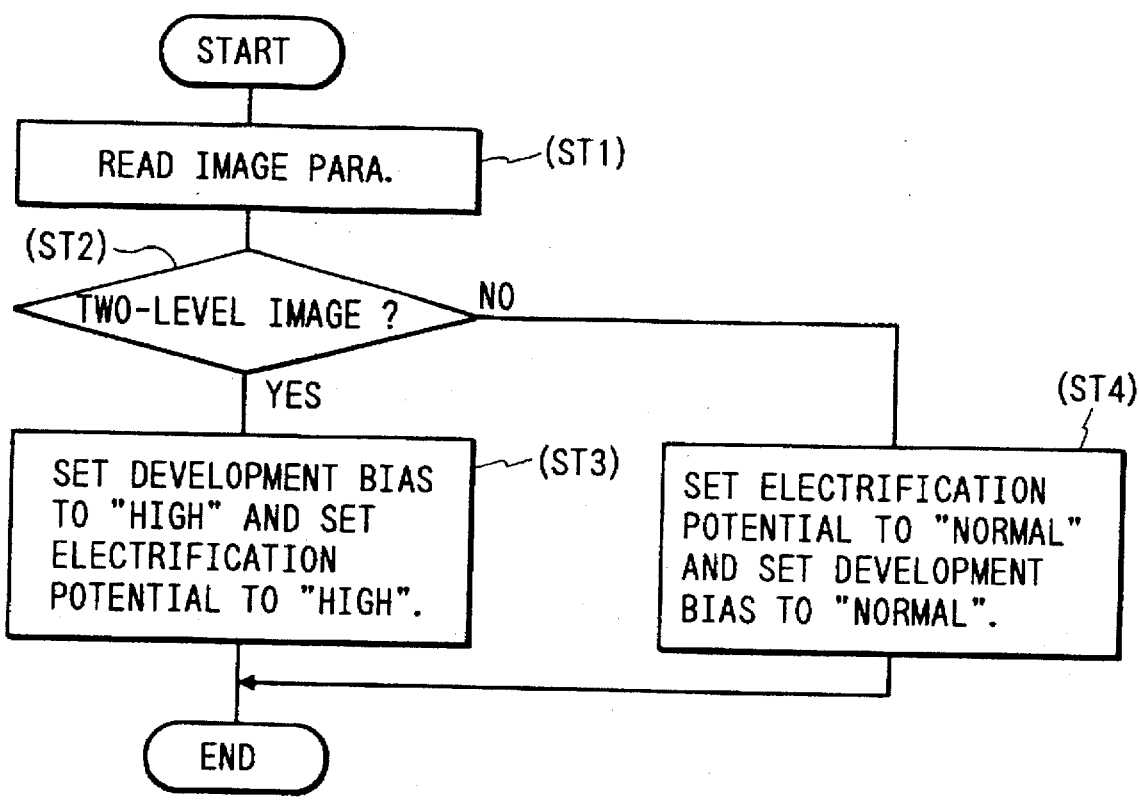
FIG. 12 is a flow chart showing picture quality control sequence employed in an embodiment of the invention.
Figure 13:
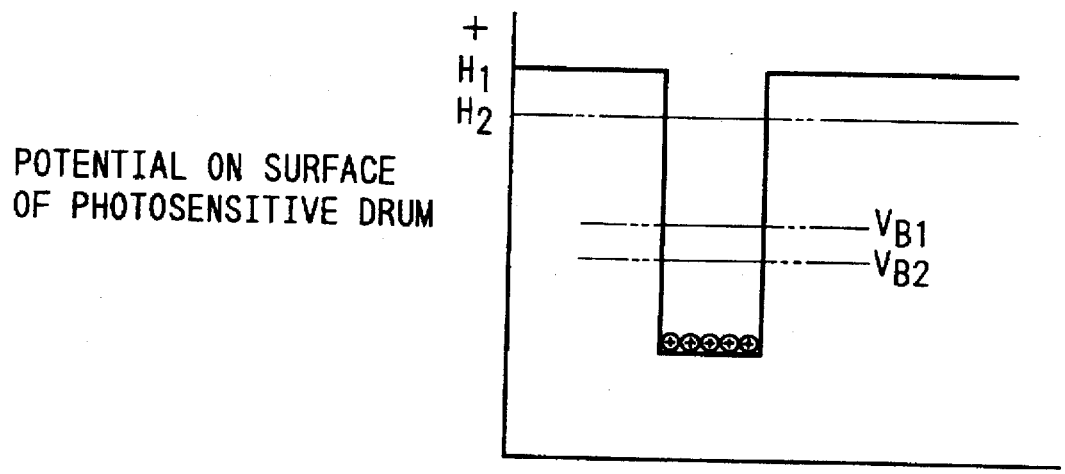
FIG. 13 is an explanatory view showing an image-forming processing in the picture quality control sequence.

The picture quality control sequence employed in this embodiment is shown in FIG. 12 and the processing thereof is shown in FIG. 13.

In FIG. 12, the CPU 131 first reads image parameters (STEP 1) and then judges from the quantity of data per pixel whether or not the image is a two-level image (STEP 2). When a decision is made that the image is a two-level image, the CPU 131 sets the electrification potential to "High" ($H_1$ in FIG. 13) and, at the same time, sets the development bias to "High" ($V_{B1}$ in FIG. 13) (STEP 3). When a decision is made that the image is a multi-level image, the CPU 131 sets the electrification potential to "Normal" ($H_2$ in FIG. 13) and, at the same time, sets the development bias to "Normal" ($V_{B2}$ in FIG. 13) (STEP 4). Thus, picture quality control is terminated.

In short, when two-level image, high-contrast images are reproduced without fogging, the picture quality is improved. And, when multi-level images are reproduced based on parameters suitable to halftone reproduction, the halftone characteristic quality is maintained.

In this embodiment, density modes such as "Thick", "Normal", "Thin", "Slightly Thin" and the like are provided in a picture quality setting portion of the scanner. The modes "Thin" and "Slightly Thin" are relatively suitable to reproduction of a two-level image. Accordingly, when a two-level image is to be reproduced, a picture quality adjusting function can be securely obtained by using the modes with no changes to the image printer 90.

Figure 14:
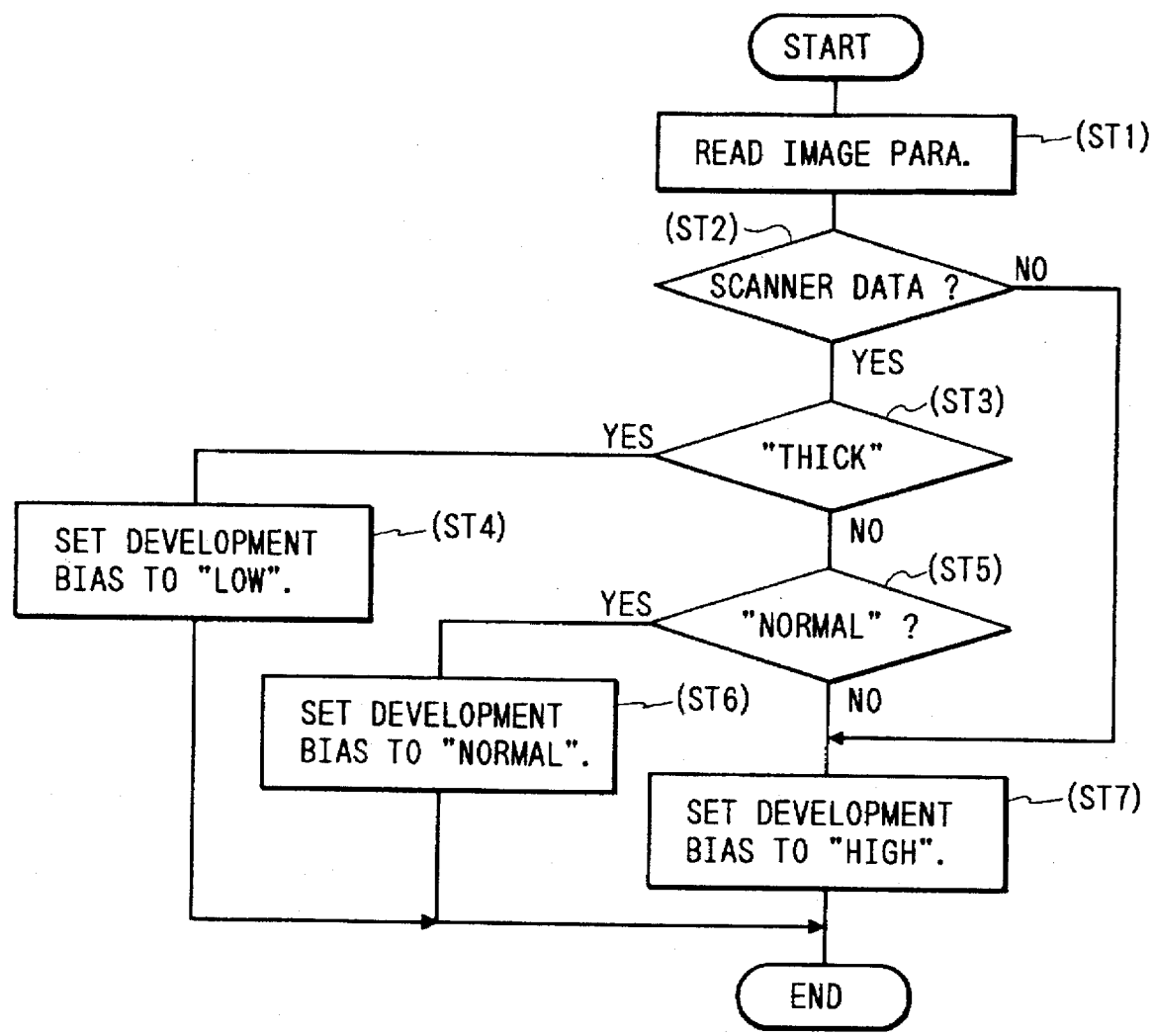
FIG. 14 is a flow chart showing picture quality control sequence as a modification.

FIG. 14 shows a modification of the picture control sequence in this embodiment. In the modification, the development bias alone is used as a print parameter. The development bias is switched corresponding to the scanner input (image input device 20)/external input (image input device 60). Further, the scanner setting modes are used for the purpose of setting the development bias.

In FIG. 14, the CPU 131 first reads image parameters (STEP 1) and then determines whether or not the data is from the scanner (STEP 2). When the data is from the scanner, the CPU 131 checks the picture quality setting mode (STEP 3 and STEP 5). When the setting mode is "Thick", the CPU sets the development bias to "Low" (STEP 4). When the setting mode is "Normal", the CPU sets the development bias to "Normal" (STEP 6). On the other hand, when the data is not from the scanner or when the picture quality setting mode of scanner data is not "Thick" and not "Normal", the CPU 131 sets the development bias to "High" (STEP 7). Thus, picture quality control is terminated.

As described above, print parameters for multi-level images or two-level images are selected corresponding to the input image data. Accordingly, printing processing suitable to the characteristic of each of the images can be carried out, so that the quality of images reproduced by the image printing means can be optimized.

In particular, when the image input function of the image input means is separated into a multi-level image input function and a two-level image input function, the type of the input image data may be determined based on the source of the input image data. Accordingly, the type of input image data can be determined very easily.

Further, the type of the input image data may be determined based on the quantity of data per pixel in the input image data. Accordingly, the type of the input image data can be readily determined even though the apparatus is of the type in which the image input means can read various types of images.

Further, when the image printing means performs a printing operation based on an electrophotographic process, the development bias voltage may be changed as a printing parameter. Accordingly, such a change can directly effect the characteristic of the printing portion to thereby optimize picture quality control.

Further, when the image printing means has a picture quality setting portion for selecting a mode for image printing, the print parameter can be changed by the print parameter changing means corresponding to the picture quality setting mode in the picture quality setting portion. Accordingly, a function for optimizing the picture quality can be obtained with no changes to the image printing means.

In particular, two-level image reproducibility can be maintained to some degree by using a predetermined mode "Thin" or "Slightly Thin" in the picture quality setting portion.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image recording apparatus comprising:

multi-level image input means for reading graphic information and for transmitting said graphic information as multi-level image data;

two-level image input means for reading graphic information and for transmitting said graphic information as two-level image data;

image printing means for printing image data received therein as a multi-level image or a two-level image based on predetermined print parameters;

image data recognizing means for determining whether the image data received from either of said multi-level image input means and said two-level image input means, is multi-level image data or two-level image data; and print parameter changing means for changing the print parameters in said image printing means based on the determination made by said image data recognizing means.

2. The image recording apparatus of claim 1, wherein said multi-level image input means is physically separated from said two-level image input means, and wherein said image data recognizing means includes means for determining whether the input image data is supplied from said multi-level image input means or from said two-level image input means.

3. The image recording apparatus of claim 1, wherein said image printing means performs a printing operation using an electrophotographic process, and wherein said print parameter changing means changes at least a development bias voltage as said print parameters.

4. The image recording apparatus of claim 1, wherein said two-level image input means include at least one of a facsimile machine, a personal computer, and a workstation.

5. The image recording apparatus of claim 1, wherein said two-level image input means include a plurality of personal computers.

6. The image recording apparatus of claim 1, wherein said two-level image input means include a plurality of workstations.

7. The image recording apparatus of claim 1, wherein said multi-level image input means include an image scanner.

8. The image recording apparatus of claim 1, wherein a specific image input means serves as said multi-level image input means and also as said two-level image input means, and wherein said image data recognizing means determines the type of the input image data based on the quantity of data per pixel in said input image data.

9. The image recording apparatus of claim 8, wherein said specific image input means include at least one of a personal computer and a workstation.

10. The image recording apparatus of claim 1, wherein said image printing means has a picture quality setting portion for selecting a mode for image printing, and wherein said print parameters changed by said print parameter changing means correspond to the picture quality setting mode in said picture quality setting portion.

11. The image recording apparatus of claim 10, wherein said print parameter changing means selects a mode "Slightly Thin" or "Thin" from the picture quality setting modes when said image data recognizing means determines that said input image data is two-level image data.

* * * * *